United States Patent [19]

Ugo

[11] 4,359,897
[45] Nov. 23, 1982

[54] APPARATUS FOR MARKING A ROTATING TIRE

[75] Inventor: John W. Ugo, Warren, Mich.

[73] Assignee: Uniroyal, Inc., New York, N.Y.

[21] Appl. No.: 238,198

[22] Filed: Feb. 25, 1981

[51] Int. Cl.³ .............................................. B60C 19/00
[52] U.S. Cl. ..................................... 73/146; 118/669;
118/712; 118/243
[58] Field of Search ............... 118/211, 712, 243, 713,
118/263, 669, 240; 427/256; 73/146

[56] References Cited

U.S. PATENT DOCUMENTS

| | | | |
|---|---|---|---|
| 3,500,681 | 3/1970 | Shively | 73/146 |
| 3,518,878 | 7/1970 | Landsness et al. | 73/146 |
| 3,526,131 | 9/1970 | Buser et al. | 73/146 |
| 3,631,716 | 1/1972 | Monajjem | 73/146 |
| 3,706,274 | 12/1972 | Coville | 118/263 X |
| 4,015,525 | 4/1977 | Shenoha | 101/333 |
| 4,135,476 | 1/1979 | Duryea | 118/263 X |

Primary Examiner—John P. McIntosh
Attorney, Agent, or Firm—Jack Posin; Charles A. Blank

[57] ABSTRACT

Apparatus and method for marking a rotating tire, for example, to indicate the point of maximum radial force variation. The apparatus includes a marker head which is pivotable into contact with an inking pad in a direction similar to the direction of rotation of the tire at the point of contact of the marker head with the tire and which is also retractable from the tire.

2 Claims, 15 Drawing Figures

APPARATUS FOR MARKING A ROTATING TIRE

This invention relates to apparatus for marking a moving object, for example, a rotating tire. More particularly, the apparatus is suitable for applying a spot of a marking substance, for example, ink, to a point on a tire under test to indicate, for example, the point of maximum radial force variation around the circumference of the tire. If desired, a marking substance visible only, for example, under ultra-violet light may be used. In such apparatus the marking substance may, for example, be contained in hot wax applied to the tire by a heated marking head.

Prior apparatus for marking a rotating tire have generally not been sufficiently accurate in providing an acceptable mark, which may be of a small size, for example, one-eighth inch in diameter.

It is an object of the present invention to provide a new and improved apparatus for marking a rotating tire which avoid one or more of the disadvantages of prior such apparatus and methods.

It is another object of the invention to provide a new and improved apparatus for marking a rotating tire with a high degree of accuracy.

It is another object of the invention to provide a new and improved apparatus for accurately marking a rotating tire with a small size mark.

In accordance with the invention, apparatus for marking a rotating tire comprises means for supplying a marking substance and marker means including a marker head which is pivotable into contact with the means for supplying a marking substance to apply the substance to the marking head. The apparatus also includes means for supporting the marker means at a position spaced from the tire, including means for pivoting the marker head into position for marking the tire, and for moving the marker head into contact with the rotating tire in response to a signal. The marker head is pivotable in a direction similar to the direction of rotation of the tire at the point of contact of the marker head with the tire, and the marker head is pivoted out of contact with the tire upon making contact with the tire. The support means is effective to displace the marker means from the tire.

For a better understanding of the present invention, together with other and further objects thereof, reference is made to the following description, taken in connection with the accompanying drawings, and its scope will be pointed out in the appended claims.

Referring now to the drawings.

Referring now more particularly to FIGS. 1–5, inclusive, apparatus 1 for marking a rotating tire 2 comprises means 3 for supplying a marking substance, for example, ink. The means 3 for supplying a marking substance includes, for example, an ink supply hose 4 which feeds ink through a bore 5 in the supply means 3 to an inking pad 6.

Figure 1:
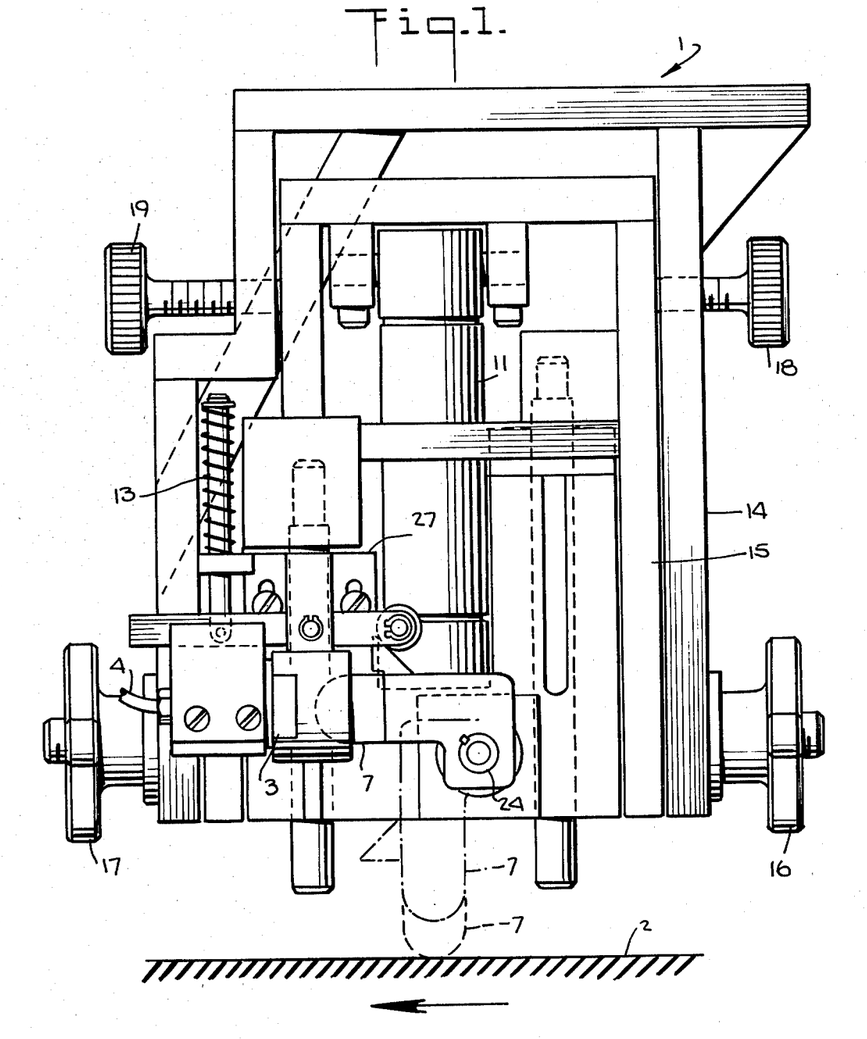
FIG. 1 is a front elevational view of marking apparatus constructed in accordance with the invention.
Figure 2:
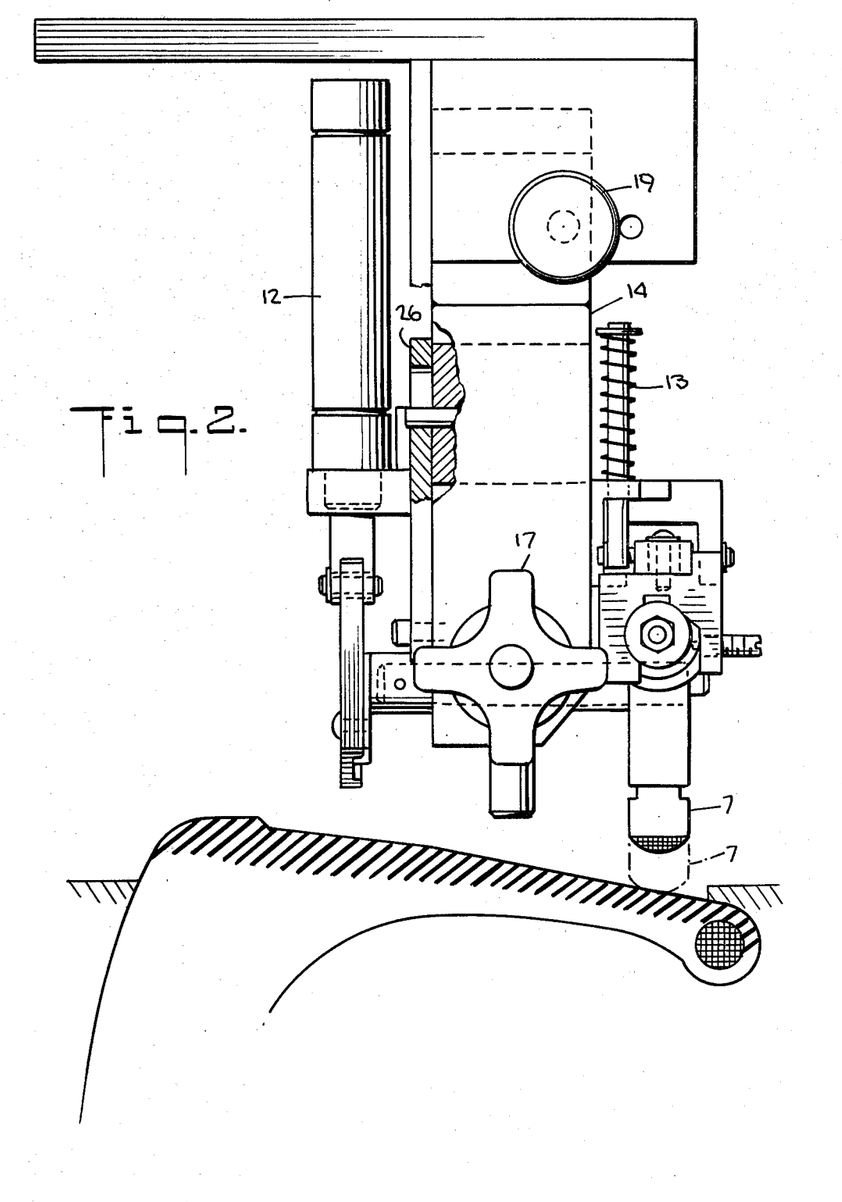
FIG. 2 is a side elevational view of the FIG. 1 apparatus.

The apparatus 1 also includes marker means including a marker head 7 which is pivotable into contact with the means for supplying a marking substance to apply the marking substance to the marking head. The marking head preferably is hard, for example, like an embossing head.

Figure 4:
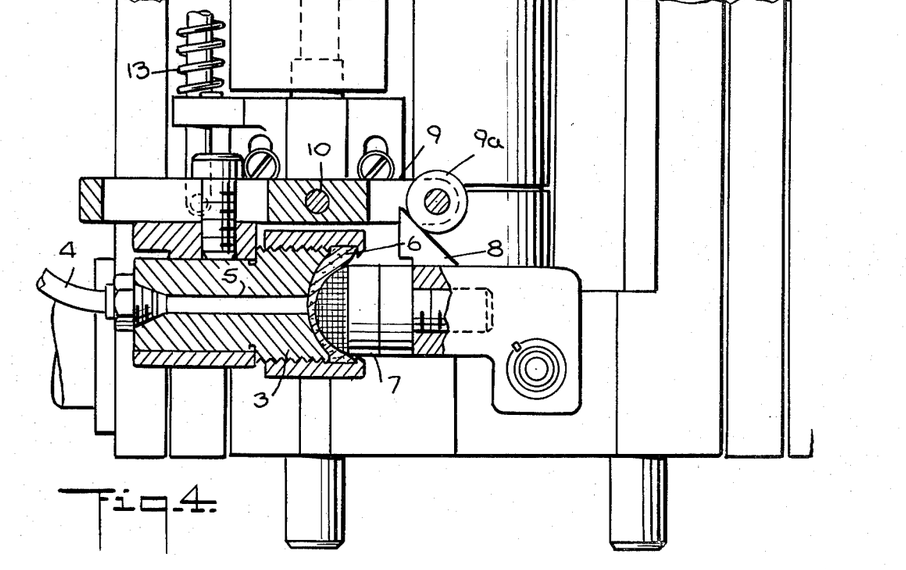
FIG. 4 is a fragmentary front elevational view, partly in section, of the FIG. 1 apparatus.
Figure 5:
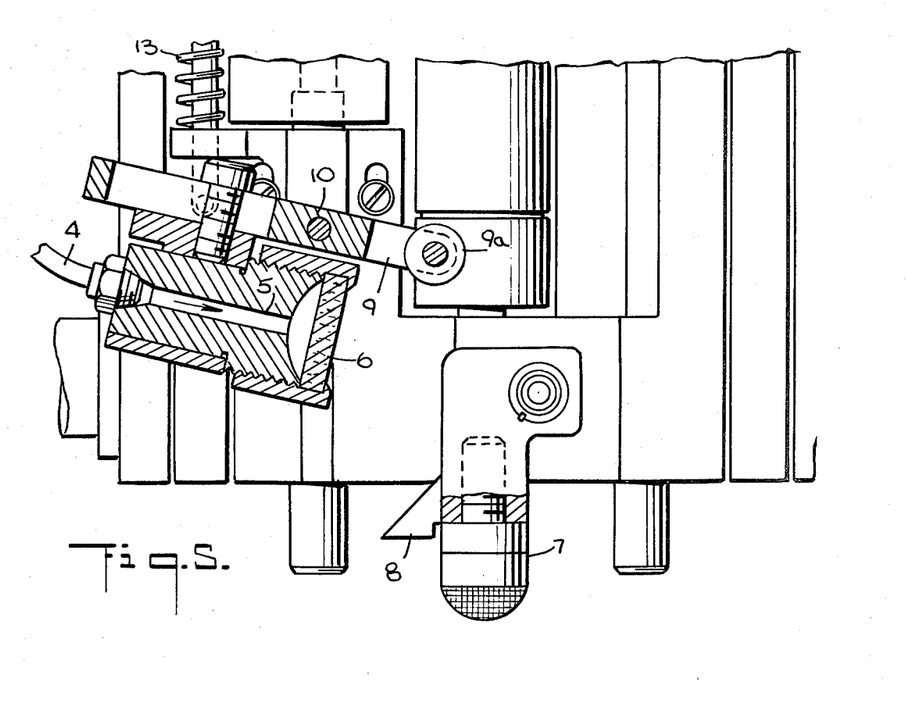
FIG. 5 is a fragmentary front elevational view, partly in section, of the FIG. 1 apparatus corresponding to FIG. 4 but with the apparatus in a different operating position.

Referring now to FIGS. 4 and 5, the marking head includes a cam 8 for striking support means preferably comprising an arm 9 with roller 9a for pivoting the inking pad 6 about pivot 10 towards the marking head 7 when the marking head moves from the direction represented in FIG. 5 into the inking pad 6. The support means arm 9 is spring-loaded by spring 13 to assume the position represented in FIG. 5.

The apparatus 1 also includes means for supporting the marker means at a position spaced from the tire. This supporting means perferably comprises a cylinder 11 (FIG. 1) for displacing the marker means towards and away from the tire 2 and means preferably comprising a second cylinder 12 shown in FIG. 2 for pivoting the marker head 7 into position for marking the tire. The means, including cylinder 11, for supporting the marker means is also effective to move the marker head 7 into contact with the rotating tire 2 in response to a signal.

The marker head 7 is pivotable in a direction similar to the direction of rotation of the tire 2 at the point of contact of the marker head with the tire, the marker head 7 being pivoted out of contact with the tire upon making contact with the tire.

The support means including the cylinder 11 is effective to displace the marker means towards and away from the tire.

Figure 3:
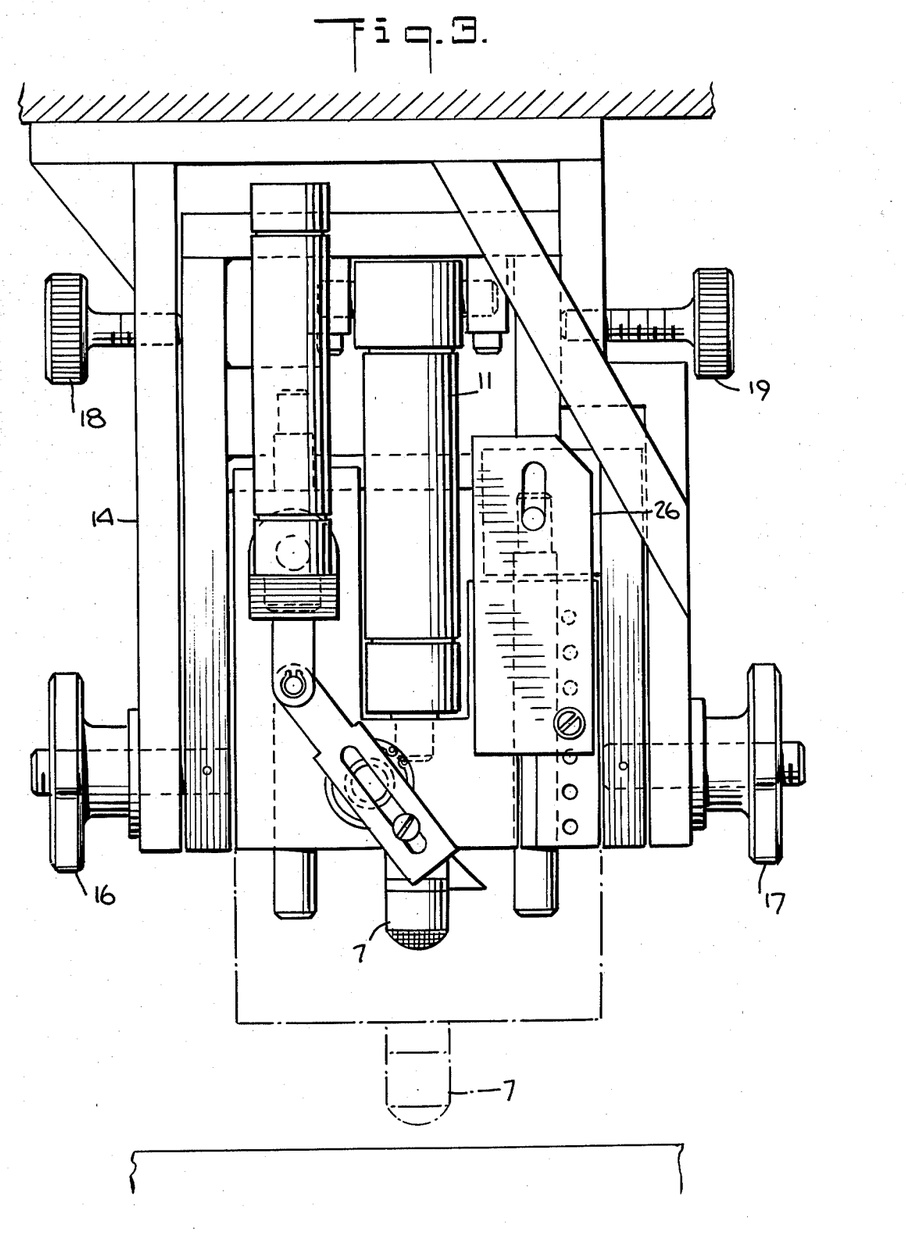
FIG. 3 is a rear elevational view of the FIG. 1 apparatus.
Figures 6, 7:
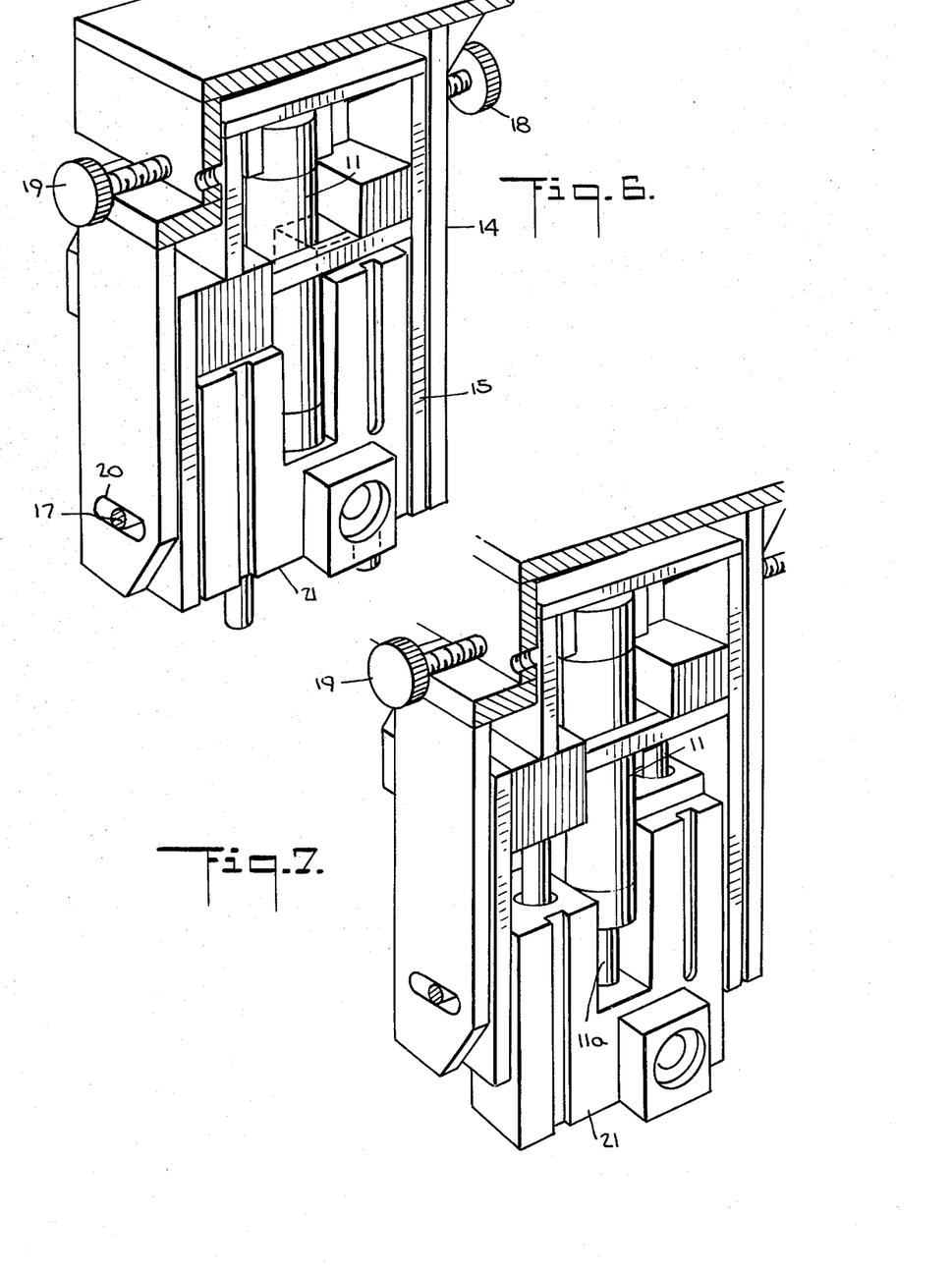
FIG. 6 is a front perspective view of a portion of the FIG. 1 apparatus.
FIG. 7 is a front perspective view of the FIG. 6 apparatus represented in FIG. 7 in a different operating position.
Figures 8, 13:
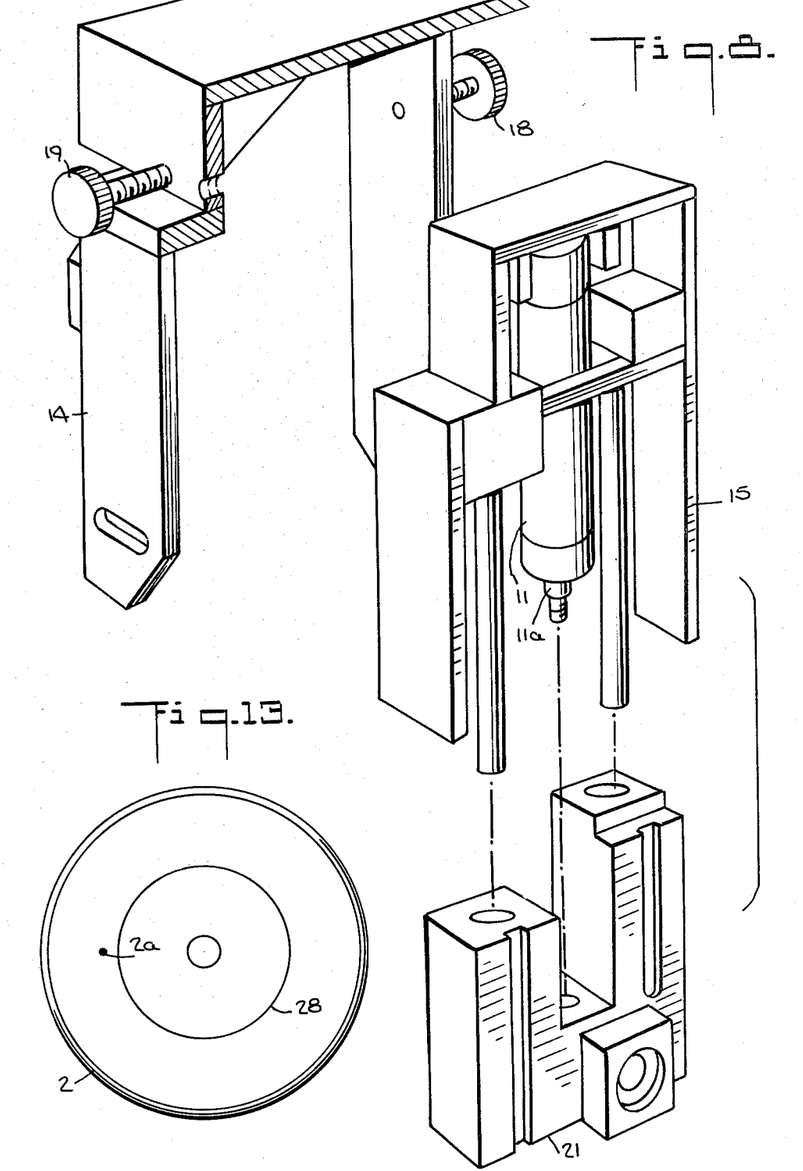
FIG. 8 is an exploded front perspective view of the FIG. 7 apparatus.
FIG. 13 is a top plan view of a tire marked by the apparatus.

Referring now to FIGS. 6–8; the support means includes a stationary frame 14 that has mounted therein an adjustable frame 15 which may be maintained in the position represented in FIG. 6 by manually adjustable screws 16,17 represented in FIG. 3 and manually adjustable screws 18,19. The slot 20 allows horizontal adjustment of the bottom of the frame 15. As represented in FIG. 7, the marker block 21 on which the marker head is mounted as represented in FIG. 1, is displaceable downwardly upon extension of the piston rod 11a of the cylinder 11.

Figures 9, 10, 11:
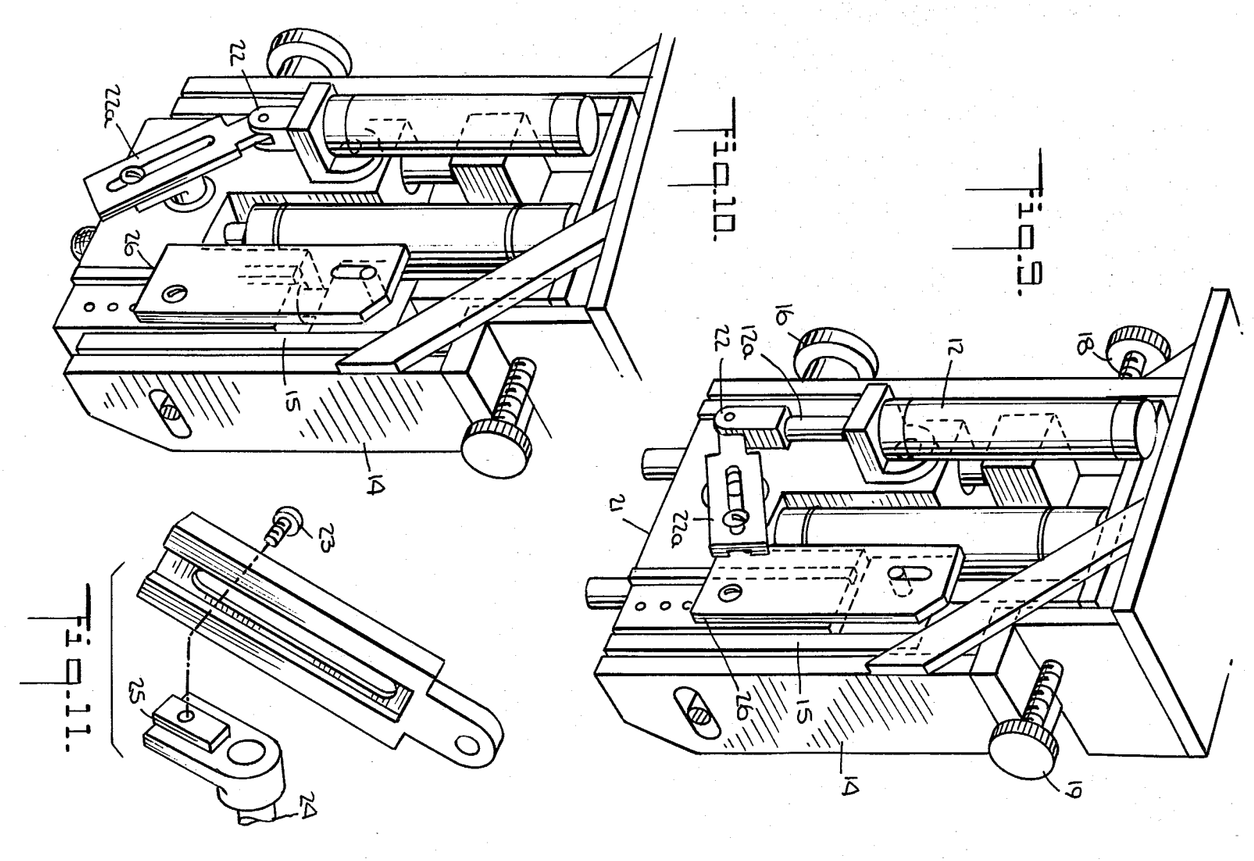
FIG. 9 is a fragmentary rear perspective view of the FIG. 1 apparatus.
FIG. 10 is a fragmentary rear perspective view of the FIG. 1 apparatus in another operating position.
FIG. 11 is a fragmentary exploded view of a portion of the FIG. 10 apparatus.

Referring now more particularly to FIGS. 9, 10 and 11, a bell crank 22 rotates the marker head 7 of FIG. 1, upon retraction of the piston rod 12a of the cylinder 12 and upon rotation of the arm 22a, which is fastened to shaft 24 by a screw and key 25.

As represented in FIGS. 3, 9 and 10, the height of the marker block 21 in its attachment to frame 15 may be adjusted as desired by positioning adjustment plate 26 to compensate for different heights of tires being marked.

As represented in FIG. 1, the height of the means 3 for supplying a marking substance may be adjusted by positioning plate 27.

Figure 12:
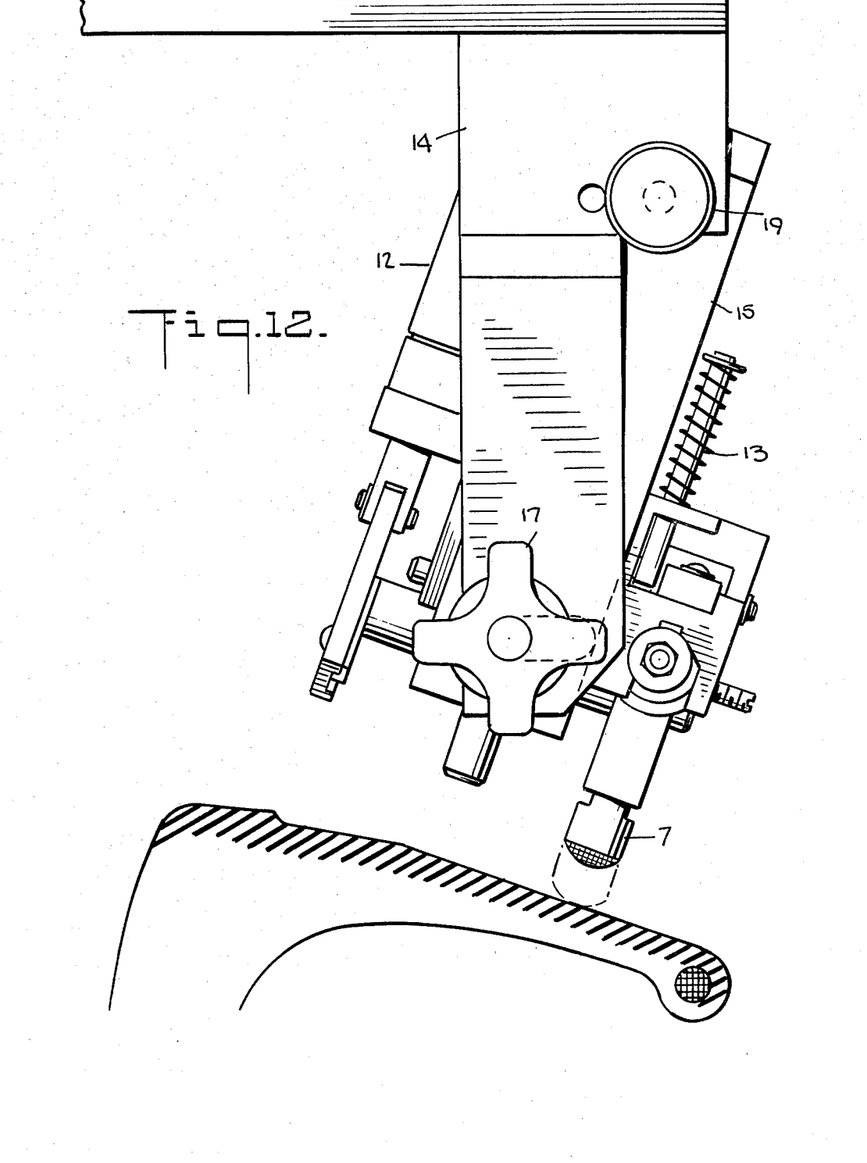
FIG. 12 is a side elevational view of the FIG. 1 apparatus in another operating position.

Referring now to FIG. 12, if desired, the adjustable frame 14 may be canted at any angle of, for example, ten degrees by adjustment of the screws 18,19 and 16,17.

FIG. 13 represents a plan view of tire 2 with a mark 2a thereon made by the marking head 7. The tire is mounted on a suitable chuck 28 represented diagrammatically.

Figure 14:
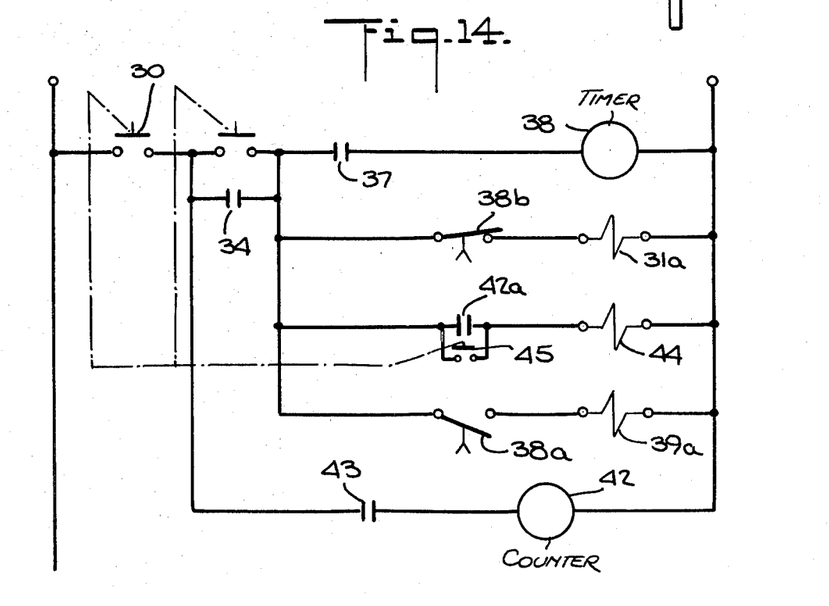
FIG. 14 is an electrical schematic diagram of a control system for the apparatus.
Figure 15:
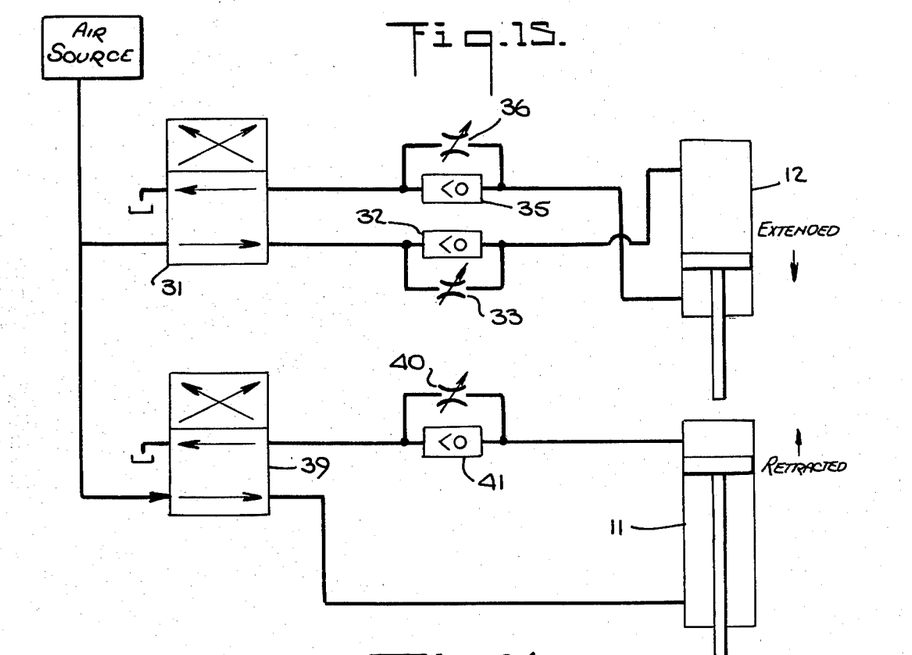
FIG. 15 is a pneumatic schematic diagram of a control system for the apparatus.

Considering now the operation of the marking apparatus with reference to the diagrams of the electrical and pneumatic control systems of FIGS. 14 and 15, the on-off switch 30, which may be a roto-push switch, is turned on while the tire 2 is undergoing test on, for example, a conventional tire uniformity grader machine. At this time the marker head 7 is in contact with the ink pad 6 and the marker means is retracted from the tire. The tire may at this time also be rotating in, for example, a counterclockwise direction under the control of the tire uniformity grader machine. Air pressure of, for example, 80 pounds per square inch is applied through the solenoid valve 31 and the flow control valve comprising a check valve 32 and an adjustable needle valve 33 to the cylinder 12 on the side of the piston to maintain the marker head in contact with the inking pad. Air pressure is also applied to the rod side of the piston of cylinder 11 to maintain the marker means retracted from the tire.

When the tire begins to rotate in, for example, the clockwise direction under the control of the tire uniformity grader machine, the contacts 34 close under the control of the tire uniformity grader machine. The solenoid 31a of the solenoid valve 31 is then energized and air pressure is applied through flow control valve 35,36 to the rod side of the piston of cylinder 12, causing the piston of cylinder 12 to shift position (retract) and pivot the marker head from the ink pad to its extended position, that is, armed-for-marking position. The piston of cylinder 11 remains in the retracted condition at this time with the marker means raised.

Contacts 37 close under the control of the tire uniformity grader machine when the machine determines that the point of maximum force variation of the tire is at a predetermined stationary reference point during the rotation of the tire. When contacts 37 close, timer 38 is energized and after a predetermined time delay when the timer times out, the contacts 38a of the timer 38 close. The predetermined time delay before the contacts 38a close is such that it allows time for the tire to rotate, for example, approximately slightly less than one revolution, to the correct position for the marker to make contact with the tire, indicating the location on the tire sidewall corresponding to the point of maximum radial force variation and taking into account the mechanical time delay involved in extending or lowering the marker means so that the marker head contacts the tire after the contacts 38a close. When the contacts 38a close, the solenoid 39a of solenoid valve 39 is energized and air pressure is applied to the side of the piston of cylinder 11 opposite to the rod end to extend the piston and to lower the marker means toward the tire.

When the contacts 38a close, the contacts 38b of the timer open, deenergizing the solenoid 31a of solenoid valve 31, causing air pressure to be applied to the side opposite to the rod side of the piston of cylinder 12. However, the flow control valves 32,33,35,36 slightly delay the motion of the piston of cylinder 12 so that the marking head strikes the tire just as air is starting to bleed from the cylinder 12.

The marker head is pivotable in a direction similar to the direction of rotation of the tire at the point of contact of the marker head with the tire. Accordingly, the tire rotation and the cylinder 2 cause the marker head to start to pivot towards the inking pad at the time the marker head makes contact with the rotating tire. The cylinder 12 then causes the marker head to pivot into contact with the inking pad.

The cam of the marker head strikes the roller on the arm of the pivoted mount for the inking pad and pivots the inking pad towards the marker head so that the marker head and inking pad come together with small impact.

After the test of the tire by the tire uniformity grader machine is completed, the contacts 34 open and the solenoid 39a of solenoid valve 39 is deengergized so that the piston of cylinder 11 is retracted to raise the marker means. The flow control valve 40,41 controls the motion of the piston of cylinder 11 to reduce the impact of the marker means on being raised to its initial position.

The counter 42 of FIG. 14 is energized every time the tire uniformity grader machine tests a tire. When the tire is tested, contacts 43 close to energize the counter which counts, for example, five or ten tests before causing contacts 42a to close. When contacts 42a close, solenoid 44 is energized, causing an ink source (not shown) to inject ink into the marking pad.

Manual push switch 45 may be used to prime the ink source to supply ink to the ink pad if the marker has not been used for a long period of time.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Apparatus for marking a rotating tire to identify the location of the maximum radial force variation thereof comprising:
    (a) means for supplying a marking substance, said means including a pad member movable between a marking-substance-supplying position and an inactive position and being normally biased toward said inactive position;
    (b) marker means including a marker body linearly reciprocally movable between an inactive position and a tire-marking position, said marker means further including a marker head carried by said marker body for pivotal movement between a marking-substance-receiving position in contact with said pad member and an armed-for-marking position at which it can contact said tire when said marker body is moved to said tire-marking position;

(c) first actuator means responsive to the initiation of a tire testing cycle for pivoting said marker head from said marking-substance-supplying position to said armed-for-marking position; and
(d) second actuator means enabled by the initiation of said tire testing cycle and thereafter responsive to the initiation of a signal identifying the location of maximum radial force variation of said tire for moving said marker body from said inactive position to said tire-marking position, said second actuator means including delay means interconnected with said first actuator means for deactuating said first actuator means in response to actuation of said second actuating means to institute pivotal return movement of said marker head to its marking-substance-receiving position, said return movement being delayed until a point in time immediately following the contact of said marker head with said rotating tire, the pivotal return movement of said marker head and the rotational movement of said tire being in substantially the same direction immediately following the contact of said marker head with said rotating tire.

2. Apparatus in accordance with claim 1 and further including cam means carried by said marker head and engageable with said pad member during movement of said marker head from its armed-for-marking position to its marking-substance-receiving position for overcoming the bias on said pad member and moving said pad member from its inactive position to its marking-substance-supplying position.

* * * * *